United States Patent
Irle et al.

(10) Patent No.: US 6,483,295 B2
(45) Date of Patent: Nov. 19, 2002

(54) INDUCTIVE LINEAR POSITION SENSOR INCLUDING EXCITING AND RECEIVING COILS AND A MOVABLE INDUCTION COUPLING ELEMENT

(75) Inventors: Henning Irle, Lippstadt (DE); Norbert Kost, Geseke (DE); Franz-Josef Schmidt, Salzkotten (DE)

(73) Assignee: Hella KG Hueck & Co., Lippstadt (DE)

( * ) Notice: Subject to any disclaimer, the term of this patent is extended or adjusted under 35 U.S.C. 154(b) by 0 days.

(21) Appl. No.: 09/864,368

(22) Filed: May 25, 2001

(65) Prior Publication Data

US 2002/0043972 A1 Apr. 18, 2002

(30) Foreign Application Priority Data

May 25, 2000 (DE) ......................................... 100 26 019

(51) Int. Cl.⁷ ................................................. G01B 7/14
(52) U.S. Cl. ............................. 324/207.17; 324/207.24; 324/207.16
(58) Field of Search ....................... 324/207.17, 207.16, 324/207.32, 207.24, 207.13, 207.15, 207.22, 207.23; 340/870.31, 870.32, 870.33, 870.35, 870.36

(56) References Cited

U.S. PATENT DOCUMENTS 5,233,294 A * 8/1993 Dreoni .................. 324/207.16
5,291,782 A * 3/1994 Taylor ......................... 73/319
6,002,250 A * 12/1999 Masreliez et al. ..... 324/207.16

FOREIGN PATENT DOCUMENTS

| DE | 2511683 | 9/1976 |
|----|---------|--------|
| DE | 4213866 | 10/1992 |
| DE | 19806290 | 8/1998 |
| DE | 19738836 | 3/1999 |
| DE | 19822516 | 12/1999 |
| GB | 2167563 | 5/1986 |

* cited by examiner

*Primary Examiner*—Edward Lefkowitz
*Assistant Examiner*—Subhash A Zaveri
(74) *Attorney, Agent, or Firm*—Birch, Stewart, Kolasch & Birch, LLP

(57) ABSTRACT

An inductive linear position sensor, particularly for use with motor vehicles has an oscillator circuit for creating a periodic alternating voltage signal, an exciting coil coupled to the oscillator circuit, a plurality of receiving coils with the exciting and receiving coils being structured as leads on a circuit board, evaluation circuitry for evaluating signals induced in the receiving coils and a movable inductive coupling element for influencing the strength of inductive coupling between the exciting coil and the receiving coils. The evaluation circuitry is arranged within the geometry of at least one of the sending (exciting) and receiving coils. Effective surface areas of the receiving coils are structured at beginning and end areas of the sensor such that, when there is no movable element present, a zero voltage results at the output taps of the receiving coils. The structure of the sensor compensates for offset voltages, which are created by asymmetrical positions of the receiving coils to the exciting coil as well as for components of the evaluation circuitry.

2 Claims, 4 Drawing Sheets

Exciting Coil   Receiving Coil 1   Receiving Coil 2   Receiving Coil 3

| Position | | Chosen Signals | |
|---|---|---|---|
| von | bis | Signal 1 | Signal 2 |
| 0 | 0,17 | U1 | U3 |
| 0,17 | 0,33 | U3 | U2 |
| 0,33 | 0,5 | U2 | U1 |
| 0,5 | 0,67 | U1 | U3 |
| 0,67 | 0,83 | U3 | U2 |
| 0,83 | 1 | U2 | U1 |

US 6,483,295 B2

INDUCTIVE LINEAR POSITION SENSOR INCLUDING EXCITING AND RECEIVING COILS AND A MOVABLE INDUCTION COUPLING ELEMENT

BACKGROUND OF THE INVENTION

This application claims a priority from German patent application 100 26 019.5, filed May 25, 2000, and the contents of that application are hereby incorporated by reference herein.

This invention concerns an inductive position sensor, particularly for use with motor vehicles, having an oscillator circuit which creates a periodic alternating voltage signal and which is coupled to an exciting coil, a plurality of receiving coils with the exciting coil and the receiving coils being structured as printed conductors or leads on a base plate or circuit board, an evaluation circuit to evaluate signals induced in the receiving coils, and a movable induction coupling element which influences a strength of inductive coupling between the exciting coil and the receiving coils.

Such a position sensor is disclosed in German patent application DE 197 38 836 A1.

A principle of this type of inductive sensor is based on inductively out-coupling of energy in the movable element that, in turn, inductively feeds back to receiving conductor loops having a special geometry. The geometry of the receiving conductor loops is chosen such that the induced voltage in the receiving conductor loops depends upon the position of the movable element.

Prior art systems and components require a significant amount of space. It is normally preferable to find solutions that require the least amount of space. This is particularly true for uses in automobiles.

An inductive sensor, however, requires a minimal surface for sensor geometry because a signal voltage of the sensor ultimately depends on coil surface area of the available coils, and the signal voltage should preferably not be small. Further, electronic circuitry also requires additional space.

It is an object of this invention to provide an inductive position sensor having a space-saving structure.

SUMMARY OF THE INVENTION

According to principles of this invention, evaluation circuitry is arranged within the geometry of the sending (exciting) and/or receiving coils and effective surfaces of the receiving coils at beginning and/or end areas of the sensor are structured such that, when no movable element is present, a zero voltage results at taps of the receiving coils.

The first part of this solution is, therefore, that the evaluation circuitry is arranged within the geometry of the sending and/or receiving coils. This results in the benefits of a reduced space requirement of the sensor structure and a reduced cost because of smaller circuit boards or base plates.

This, however, leads to an asymmetrical loading of the sensor, because pads, leads and components necessary for circuitry form partial inductive short circuits. The effect is that voltage induced in the receiving coils by the exciting coil differs from zero, so that an offset voltage appears on receiving-coil terminals. In the second part of this solution, these offset voltages are compensated for by adapting the geometry of the receiving coils at beginning or ending areas of the sensor.

BRIEF DESCRIPTION OF THE DRAWINGS

Further benefits, characteristics and details of the invention are explained in more detail below using embodiments shown in the drawings. The described and drawn features can be used individually or in preferred combinations in other embodiments of the invention. The foregoing and other objects, features and advantages of the invention will be apparent from the following more particular description of the preferred embodiment of the invention, as illustrated in the accompanying drawings in which reference characters refer to the same parts throughout the different views. The drawings are not necessarily to scale, emphasis instead being placed upon illustrating principles of the invention in a clear manner.

DETAILED DESCRIPTION OF THE INVENTION

Structure and operation of a sensor of this invention will now be described in more detail with reference to the drawings.

Figure 1:
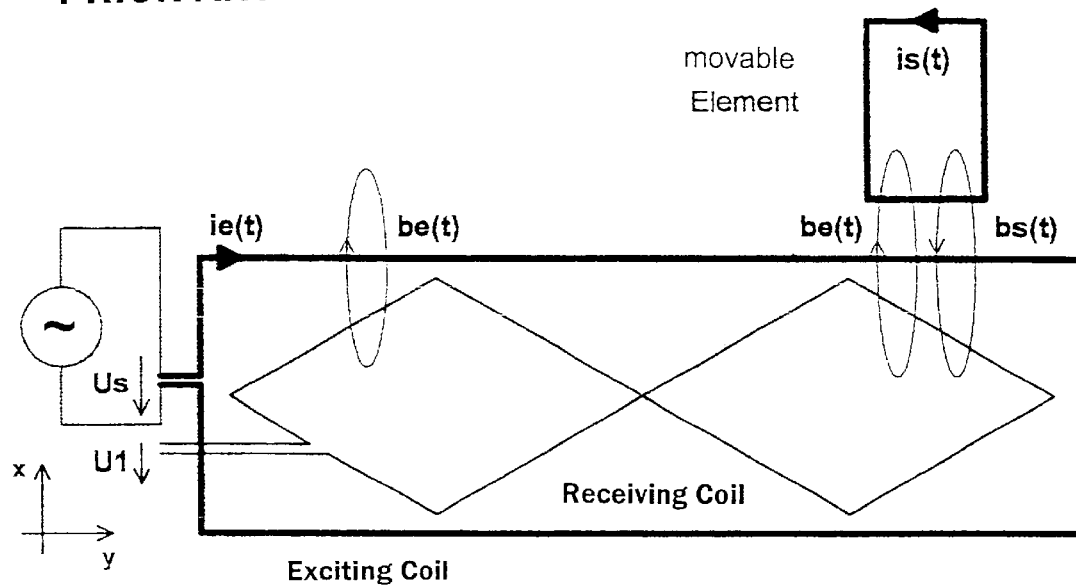
FIGS. 1 and 2 are simplified circuit diagrams of a basic prior art inductive sensor of a type with which this invention can be used.

The basic principle of operation of sensors with which this invention is used is illustrated in FIG. 1. It should be noted that a movable element is normally, in practice, located above the coils, but here it is shown near the coils for ease of illustration.

An alternating current ie(t) is applied to the exciting coil that creates an alternating magnetic field be(t). The alternating magnetic field be(t) induces in the movable element, which in a simplified form is a closed conductive loop, a current is(t) that, in turn, creates an alternating magnetic field bs(t) that opposes the exciting alternating magnetic field be(t).

Figure 2:
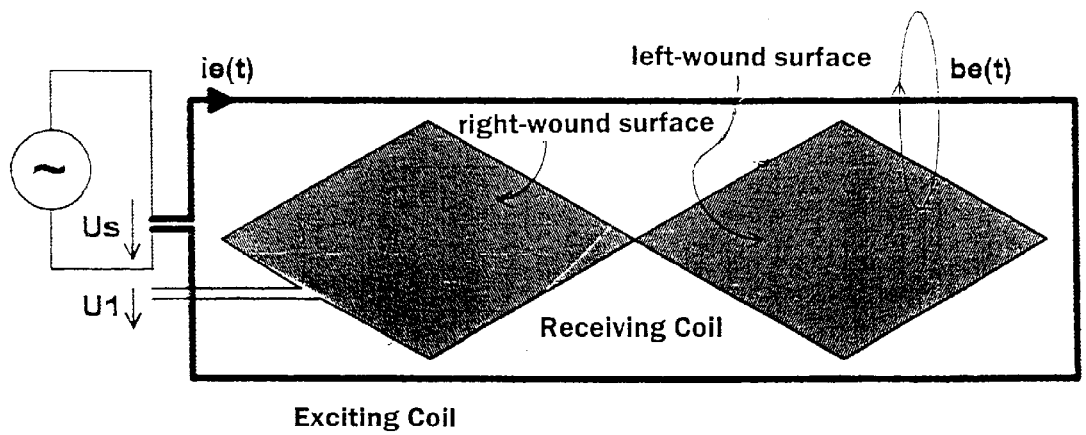

A voltage is induced in the receiving coil from the overlapping alternating magnetic fields be(t)+bs(t) according to the relationship $$U1 = \frac{d\Phi}{dt} = -\frac{d\int [b_e(t,x,y) + b_s(t,x,y)]dA}{dt} = \frac{d}{dt}\int b_e(t,x,y)dA + \frac{d}{dt}\int b_s(t,x,y)dA$$

with A representing a surface area of the receiving coil. It should be noted that the receiving coil actually is of two surfaces, having surface normals, or poles, directed in opposite directions. The result is that, with a symmetrical receiving coil geometry as shown here, the portion of the induced voltage that is caused by the exciting coil is zero (see FIG. 2), that is $$\frac{d}{dt}\int b_e(t, x, y)dA = 0$$

Figure 3:
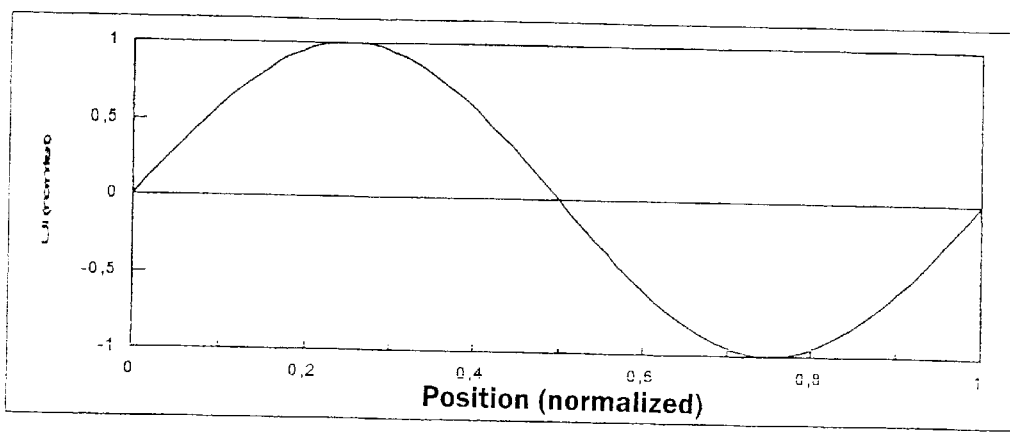
FIG. 3 is a graph illustrating operational features of the device depicted in FIGS. 1 and 2.

Thus, ideally, only a voltage induced by the movable element remains, which voltage varies in sine wave form in dependence on the linear position of the movable element. To make this clearer, FIG. 3 depicts a normalized voltage amplitude of a receiving coil versus a likewise normalized position of the movable element.

Figure 4:
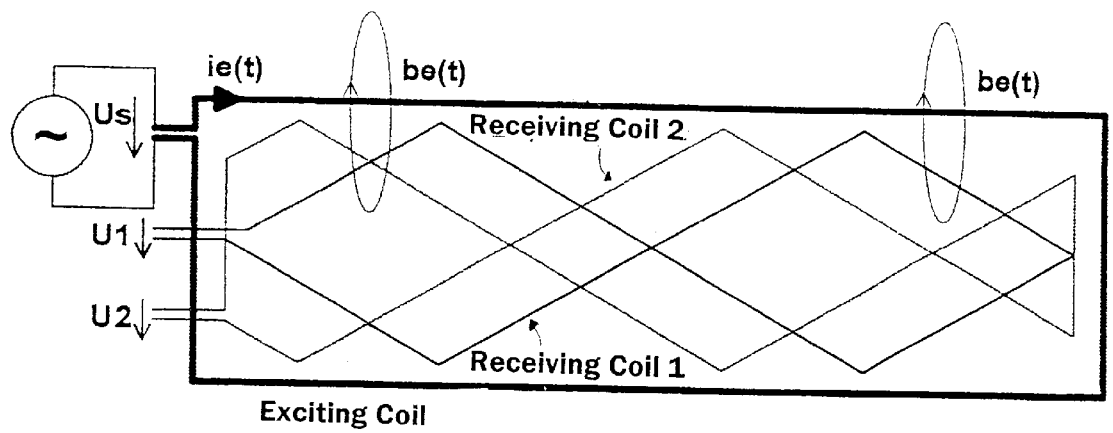
FIGS. 4 and 5 are simplified circuit diagrams of inductive linear sensors with multiple receiving coils.

The sensor principle described to this point is operational, however it is disturbing that each change of the exciting current as well as each change of mechanical conditions (spacing, angle, inclination of the movable element to the receiving coil) influences an output signal. This can be corrected, however, by using a second receiving coil, offset from the first receiving coil, and rather than taking the output signal directly, forming an output signal from a ratio developed from the obtained signals. A simplified illustrative structure is shown in FIG. 4. With a relative-relationship, or ratio, development, the output signal can be made to be independent of the influences mentioned above.

Figure 5:
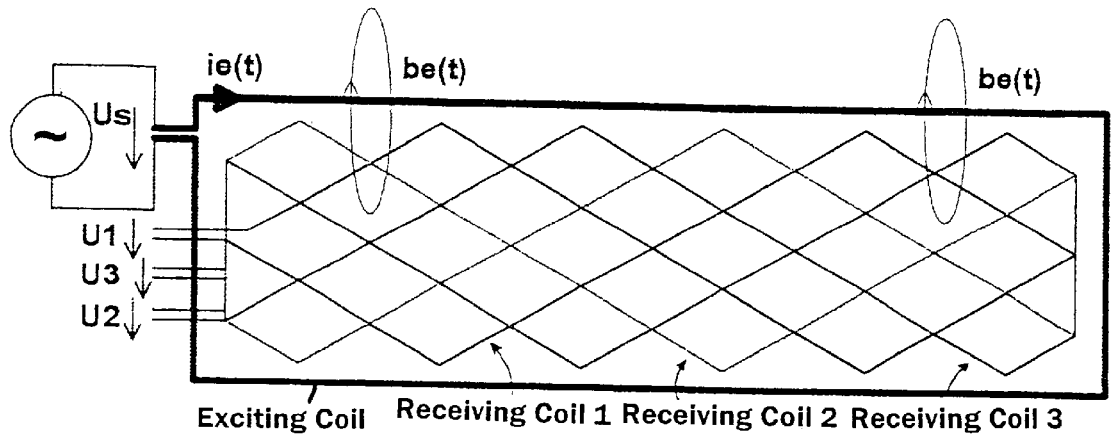

As a rule, it is desirable for such a sensor to have a linear relationship between a monitored position and an output signal. Since the output signals of the receiving coils (U1, U2), however, are not linear, a simple ratio-calculated output signal is also not linear. This can be corrected, however, if only substantially the linear portions of the output signal, near the zero crossings, are used. So that the used portions are sufficiently linear, depending upon an exactness required, additional relatively-displace-from-one-another receiving coils are used. FIG. 5 depicts, for the sake of simplicity, a sensor with only three receiving coils. The principle is extendable, however, also to having more receiving coils.

Figures 6, 6A:
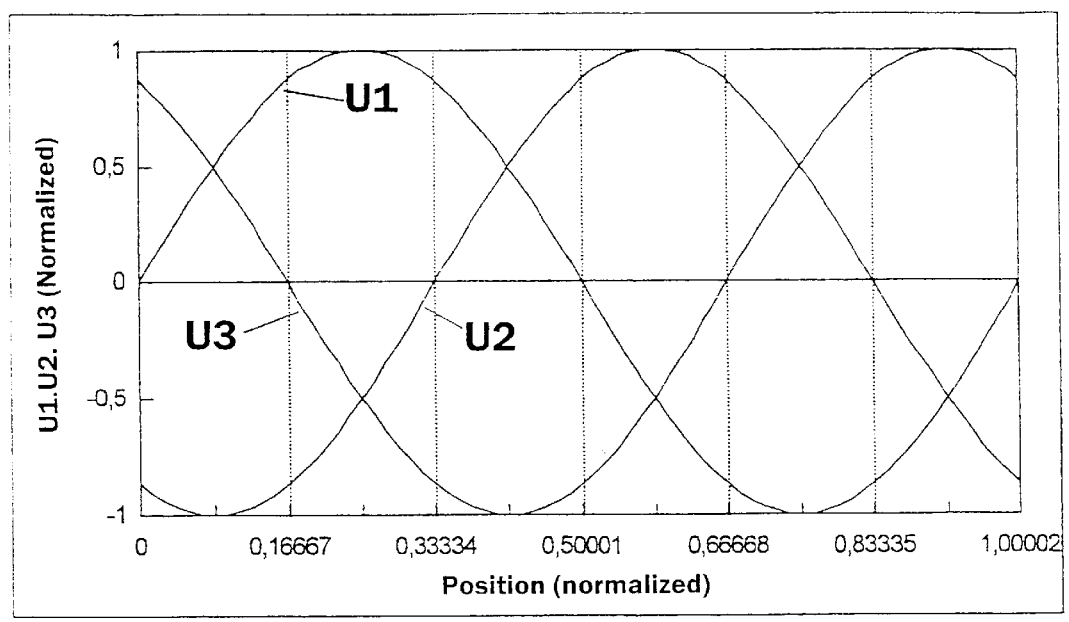
FIG. 6 is a graph illustrating operational characteristics of a multiple-receiving-coil inductive position sensor.
FIG. 6A is a table illustrating operational characteristics of an inductive position sensor with multiple receiving coils.

The normalized output signals U1, U2, U3 of the three receiving coils are shown in FIG. 6, and, indeed, adjacent the normalized positions of the movable element.

From these three output signals, the two signals that are located nearest the zero crossing, for each position, are selected and used for ratio, or relative-relationship, forming. This selection principle is made clearer by the table of FIG. 6A.

Figure 7:
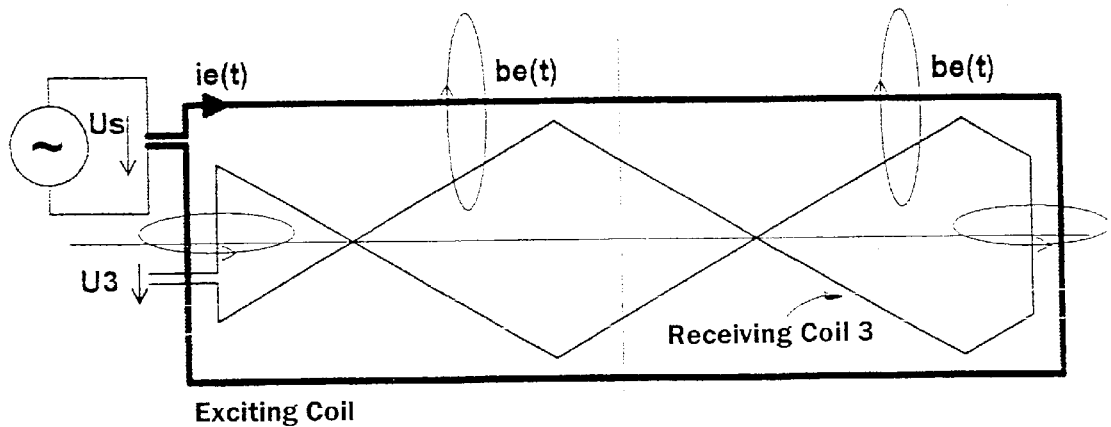
FIGS. 7 through 9 are simplified circuit diagrams of inductive linear sensors illustrating this invention.

Because more relatively-displaced receiving coils are now necessary, however, the problem arises that the voltage induced in the receiving coils by the exciting coil is no longer negligible, as should be shown on the receiving coil 3 as follows (see FIG. 7).

The portion of the voltage induced in the receiving coil 3 by the length sides of the exciting coil results in a zero sum because the receiving coils lie in symmetry to the length axis of the exciting coil. The portion induced by the end sides of the exciting coil, contrary thereto, differs from zero, because the receiving coils lie asymmetrical to the short axis of the exciting coil (more particularly, $$\frac{d}{dt} = \int b_e(t, x, y)dA \neq 0,$$

where dA is a surface area predetermined by an edge curve of the exciting coil 3). Below, the voltage induced in the receiving coil by the exciting coil will be referred to as the offset voltage.

The inductive coupling between the exciting coil and the receiving coils is, of course, substantially larger than the inductive coupling between the movable element and the receiving coils. This means that the asymmetrically-produced voltage on the receiving coils totals a multiple of the voltage coupled in from the movable element. This creates, therefore, difficulties for further processing the signal and leads also to substantial measuring errors.

In order to compensate for the asymmetry-caused offset voltage, an effective surface of the receiving coils, at the beginning or end areas of the linear sensor, is structured such that when the movable element is not present, a zero sum voltage results at output taps of the receiving coils.

Figure 8:
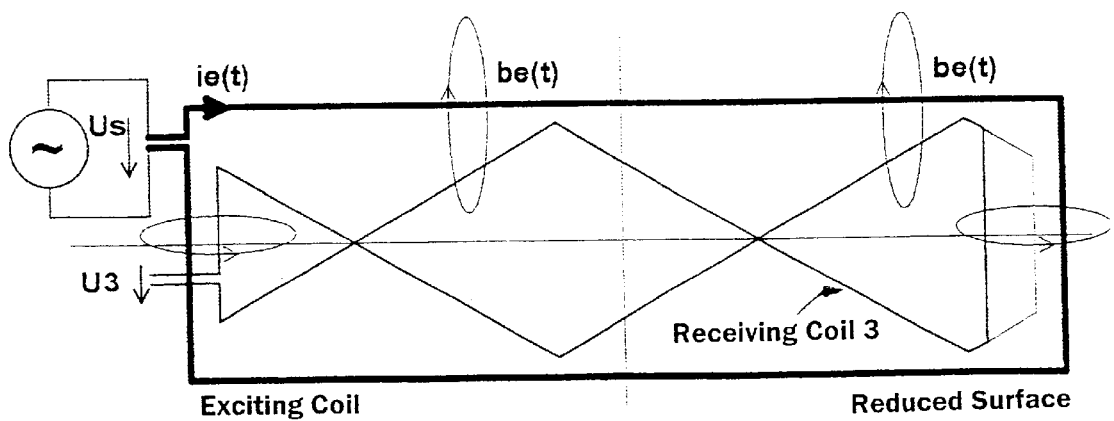

This can take place in an uncomplicated manner by having the effective surface area of the receiving coils reduced a targeted amount (or, if necessary, made larger), which is shown schematically in FIG. 8.

By reducing the size of the surface area, the offset voltage is reduced and a point can be found at which $$\frac{d}{dt}\int b_e(t, x, y)dA = 0$$

That is, that the offset voltage equals zero.

Normally, this procedure leads to a maximum measuring path of the sensor being reduced. This is because at the beginning and end areas of the linear sensor there is greater inexactness and by reducing the surface area also the area between the beginning and end of the sensor is also made smaller. The inexactness at the beginning and end areas comes about because a portion of the magnetic fields created by the movable element pass by end sides of the receiving coils, that is, so to speak, at the finiteness of the receiving coils.

When three or more receiving coils are used, there is, however, the possibility of only reducing the surfaces of the receiving coils not needed at the beginning and end areas (to calculate the sensor signals only two respective receiving coils are needed). This counteracts the disadvantage that the measuring path is reduced.

Figure 9:
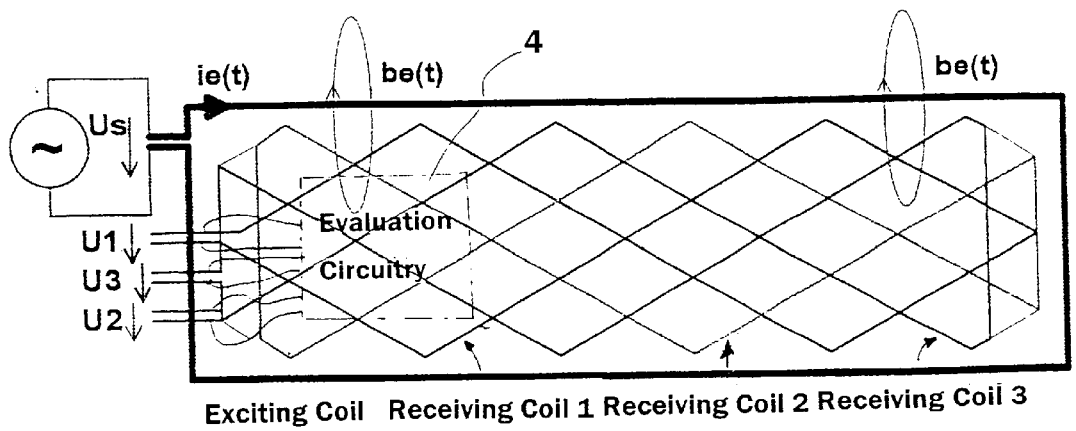

In the embodiment of FIG. 9, receiving coil 3 at the right end and receiving coil 2 at the left end of the sensor are reduced in size. The table of FIG. 6A confirms that U3 at the right end of the sensor and U2 at the left end of the sensor are not needed.

So that the invention as a whole is clearer, evaluation circuitry, which in particular can be formed as one or more integrated circuits, is shown as a block in FIG. 9. The evaluation circuitry can be arranged, e.g. in FIG. 9, within an area surrounded by the exciting coil so that the voltages U1, U2 and U3 of the receiving coil are directly fed to the evaluation circuitry. The previously described compensation of the coil voltages at the same time respects, or compensates for, offset voltages caused by components of the evaluation circuitry.

I claim:

1. Inductive linear position sensor comprising an oscillator circuit which creates a periodic alternating voltage signal and which is coupled to an exciting coil, a plurality of receiving coils with the exciting and the receiving coils being structured as conductors on a circuit board, an evaluation circuit to evaluate signals induced in the receiving coils operatively coupled to taps of the receiving coils, and a movable induction coupling element which influences a strength of inductive coupling between the exciting coil and the receiving coils;

wherein the evaluation circuitry is arranged within the geometry of at least one of the exciting and receiving coils and wherein the effective surface area of the receiving coils at beginning and end areas of the linear position sensor are structured in such a way that when the movable element is not present, a zero voltage results at the taps of the receiving coils.

2. The inductive position sensor of claim 1 wherein a surface area of at least a first receiving coil at one of a beginning and an end area of the sensor is smaller than a surface area of the first receiving coil at a middle area of the sensor; and wherein the first receiving coil is not used to determine an output signal of the sensor at the end of the sensor at which the smaller surface area is located.

* * * * *